(12) United States Patent
Huang et al.

(10) Patent No.: US 11,240,159 B2
(45) Date of Patent: *Feb. 1, 2022

(54) SERVICE LINK SELECTION CONTROL METHOD AND DEVICE

(71) Applicant: Huawei Technologies Co., Ltd., Shenzhen (CN)

(72) Inventors: Shibi Huang, Shenzhen (CN); Yong Tian, Shenzhen (CN); Linda Dunbar, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

This patent is subject to a terminal disclaimer.

(21) Appl. No.: 16/529,325

(22) Filed: Aug. 1, 2019

(65) Prior Publication Data

US 2019/0356596 A1 Nov. 21, 2019

Related U.S. Application Data

(63) Continuation of application No. 15/280,682, filed on Sep. 29, 2016, now Pat. No. 10,397,120, which is a
(Continued)

(30) Foreign Application Priority Data

Apr. 1, 2014 (CN) .......................... 201410129900.6

(51) Int. Cl.
*G01R 31/08* (2020.01)
*H04L 12/851* (2013.01)
(Continued)

(52) U.S. Cl.
CPC ...... *H04L 47/2441* (2013.01); *H04L 41/0893* (2013.01); *H04L 45/306* (2013.01);
(Continued)

(58) Field of Classification Search
None
See application file for complete search history.

(56) References Cited

U.S. PATENT DOCUMENTS

| 7,529,943 B1 * | 5/2009 | Beser ............... H04L 63/123 370/236 |
| 2008/0177896 A1 | 7/2008 | Quinn et al. |

(Continued)

FOREIGN PATENT DOCUMENTS

| CN | 101374100 A | 2/2009 |
| CN | 102487530 A | 6/2012 |

(Continued)

OTHER PUBLICATIONS

Liu et al., "Service Function Chaining Use Cases; draft-liu-sfc-use-cases-00," Internet-Draft, Intended status: Informational, XP15095146, pp. 1-14, Network Working Group (Oct. 10, 2013).
(Continued)

*Primary Examiner* — Gerald A Smarth
(74) *Attorney, Agent, or Firm* — Leydig, Voit & Mayer, Ltd.

(57) ABSTRACT

Disclosed are a flow classifier, policy and charging rules function unit and controller. The flow classifier receives a service chain selection control policy sent by a policy and charging rules function unit. The service chain selection control policy includes a corresponding relation between an application type and an identifier of a service chain. The service chain is a path formed by a forwarding device and a value-added service device both of which a service flow with the application type needs to pass through. The flow classifier detects the service flow with the application type based on the service chain selection control policy and adds the identifier of the service chain to a message of the service flow. The flow classifier sends the message of the service
(Continued)

flow with the added identifier of the service chain to a forwarding device directly connected to the flow classifier.

10 Claims, 6 Drawing Sheets

Related U.S. Application Data continuation of application No. PCT/CN2015/074502, filed on Mar. 18, 2015.

(51) Int. Cl.
*H04L 12/24* (2006.01)
*H04L 12/725* (2013.01)
*H04L 29/08* (2006.01)
*H04L 12/721* (2013.01)
*H04M 15/00* (2006.01)
*H04L 12/859* (2013.01)

(52) U.S. Cl.
CPC ............ *H04L 67/327* (2013.01); *H04L 45/38* (2013.01); *H04L 47/2475* (2013.01); *H04M 15/66* (2013.01)

(56) References Cited

U.S. PATENT DOCUMENTS

| | | | |
|---|---|---|---|
| 2009/0037713 | A1 | 2/2009 | Khalid et al. |
| 2009/0310480 | A1 | 12/2009 | Bao et al. |
| 2009/0313385 | A1 | 12/2009 | MacDonald et al. |
| 2011/0122870 | A1 | 5/2011 | Dixon et al. |
| 2011/0170412 | A1 | 7/2011 | Ramadas et al. |
| 2012/0087262 | A1 | 4/2012 | Rasanen et al. |
| 2012/0140449 | A1 | 12/2012 | Chen et al. |
| 2014/0010084 | A1 | 1/2014 | Kavunder et al. |
| 2014/0010085 | A1 | 1/2014 | Kavunder et al. |
| 2014/0334295 | A1* | 11/2014 | Guichard ............ H04L 47/2441 370/230 |
| 2015/0063102 | A1* | 3/2015 | Mestery ................. H04L 41/50 370/230 |
| 2015/0092551 | A1 | 4/2015 | Moisand et al. |
| 2015/0215819 | A1 | 7/2015 | Bosch et al. |
| 2015/0263901 | A1* | 9/2015 | Kumar .................... H04L 45/02 370/254 |
| 2015/0381493 | A1* | 12/2015 | Bansal .................. H04L 45/745 370/392 |
| 2017/0149670 | A1* | 5/2017 | Backman ................ H04L 45/38 |

FOREIGN PATENT DOCUMENTS

| | | |
|---|---|---|
| CN | 102571613 A | 7/2012 |
| CN | 102843269 A | 12/2012 |
| CN | 103269280 A | 8/2013 |
| CN | 103430487 A | 12/2013 |
| CN | 103905447 A | 7/2014 |
| CN | 103905447 B | 6/2017 |
| EP | 2983328 A1 | 2/2016 |

OTHER PUBLICATIONS

Jiang et al.,"An Architecture of Service Function Chaining; draft-jiang-sfc-arch-01.txt," pp. 1-12, XP1509057 (Feb. 14, 2014).
Dunbar et al., "Architecture for Chaining Legacy Layer 4-7 Service Functions; draft-dunbar-sfc-le~iacy-14-17-chain-architecture-03. txt," pp. 1-17, XP15096592 (Feb. 10, 2014).

* cited by examiner

SERVICE LINK SELECTION CONTROL METHOD AND DEVICE

CROSS-REFERENCE TO RELATED APPLICATIONS

This application is a continuation of U.S. patent application Ser. No. 15/280,682, filed on Sep. 29, 2016, which is a continuation of International Application No. PCT/CN2015/074502, filed on Mar. 18, 2015, which claims priority to Chinese Patent Application No. 201410129900.6, filed on Apr. 1, 2014. All of the aforementioned patent applications are hereby incorporated by reference in their entireties.

TECHNICAL FIELD

The present application relates to the field of communication, particularly to a service chain selection control method and device.

BACKGROUND

Figure 1:
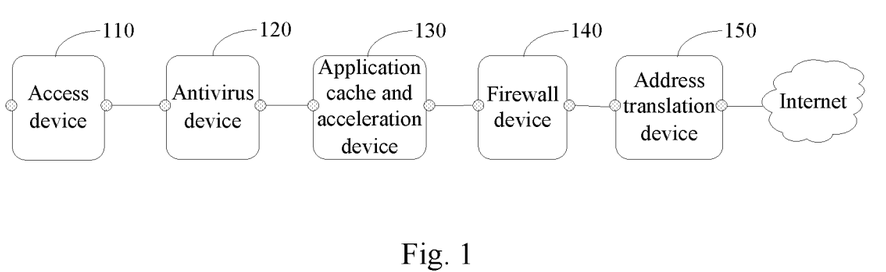
FIG. 1 is a diagram of an example of a message transmission path in the prior art.

In the prior art, as shown in FIG. 1, a large number of value-added service devices, including an antivirus device 120, an application cache and acceleration device 130, a firewall 140, a network address translation (NAT) device 150 or the like, are connected in series between an access device 110 and the internet. Data generated by a user terminal after the user terminal accesses the network through the access device 110 has to pass through the antivirus device 120, the application cache and acceleration device 130, the firewall 140, and the network address translation device 150 sequentially. In practical use, some users may only sign up for an antivirus service, and some other users may only need the network address translation. However, in the prior art, the antivirus device 120, the application cache and acceleration device 130, the firewall 140, and the network address translation device 150 have to be passed through sequentially, thereby causing unnecessary traffic burden to these devices.

SUMMARY

A service chain selection control method and device are provided in the disclosure, being able to select an appropriate service chain and avoid passing a superfluous device.

In a first aspect, a service chain selection control method is provided in the application. The service chain selection control method includes: receiving, by a flow classifier, a service chain selection control policy sent by a policy and charging rules function PCRF unit, where the service chain selection control policy includes a corresponding relation between an application type and an identifier of a service chain, and the service chain is a path formed by a forwarding device and a value-added service device both of which a service flow with the application type needs to pass through; detecting, by the flow classifier, the service flow with the application type based on the service chain selection control policy, and adding the identifier of the service chain to a message of the service flow; and sending, by the flow classifier, the message of the service flow with the added identifier of the service chain to a forwarding device directly connected to the flow classifier.

Combined with the first aspect, in a first possible implementation of the first aspect of the application, the receiving the service chain selection control policy sent by the PCRF unit includes: receiving, through an extended Gx interface protocol, the service chain selection control policy sent by the PCRF unit.

In a second aspect, a service chain selection control method is provided in the application. The service chain selection control method includes: receiving, by a policy and charging rules function PCRF unit, a service chain selection policy sent by a cooperation device, where the service chain selection policy includes a corresponding relation among first policy contextual information, a first application type and a first service chain, the first service chain is a path formed by a forwarding device and a value-added service device both of which a first service flow needs to pass through, the first service flow is from a user matching the first policy contextual information, and a type of the first service flow is the first application type; and where the service chain selection policy further includes a corresponding relation among second policy contextual information, a second application type and a second service chain, the second service chain is a path formed by a forwarding device and a value-added service device both of which a second service flow needs to pass through, the second service flow is from a user with the second policy contextual information, and a type of the second service flow is the second application type; receiving, by the PCRF unit, the first policy contextual information, and determining a service chain selection control policy based on the first policy contextual information and the service chain selection policy, wherein the service chain selection control policy includes a corresponding relation between the first application type and the first service chain; and sending, by the PCRF unit, the service chain selection control policy to a flow classifier.

Combined with the second aspect, in a first possible implementation of the second aspect of the application, the policy contextual information includes at least one of subscriber signing type information, subscriber terminal access type information, subscriber terminal location information and cell congestion information.

Combined with the second aspect, in a second possible implementation of the second aspect of the application, the sending the service chain selection control policy to the flow classifier includes: sending the service chain selection control policy to the flow classifier through an extended Gx interface protocol.

In a third aspect, a service chain selection control method is provided in the application. The service chain selection control method includes: receiving, by a controller, a logic service chain definition sent by a cooperation device, where the logic service chain definition includes information of a value-added service device through which a service chain needs to pass, the service chain is a path through which a service flow needs to pass, the service chain includes forwarding devices and value-added service devices through which the service flow needs to pass, and each service chain has an identifier; generating, by the controller, a flow forwarding table for each forwarding device through which the service chain passes, based on the logic service chain definition, where the flow forwarding table includes matching information and operation information, the matching information includes the identifier of the service chain, and the operation information is to instruct one of the forwarding devices to send a message having the identifier to a value-added service device in the service chain directly connected to the forwarding device after the message is received, and to forward the message returned by the value-added service device to a next forwarding device in the service chain after the message is returned by the value-added service device;

and sending, by the controller, a flow forwarding table generated for each forwarding device to each forwarding device through which the service chain passes.

In a third aspect, a flow classifier is provided in the application. The flow classifier includes a receiving module, an executing module and a sending module. The receiving module is configured to receive a service chain selection control policy sent by a policy and charging rules function PCRF unit, where the service chain selection control policy includes a corresponding relation between an application type and an identifier of a service chain, and the service chain is a path formed by a forwarding device and a value-added service device both of which a service flow with the application type needs to pass through, and the receiving module sends the service chain selection control policy to the executing module. The executing module is configured to receive the service chain selection control policy, detect the service flow with the application type based on the service chain selection control policy, and add the identifier of the service chain to a message of the service flow, and the executing module sends the message with the added identifier of the service chain to the sending module. The sending module is configured to receive the message with the added identifier of the service chain, and send the message of the service flow with the added identifier of the service chain to a forwarding device directly connected to the flow classifier.

Combined with the third aspect, in a first possible implementation of the third aspect of the application, the receiving module is configured to receive, through an extended Gx interface protocol, the service chain selection control policy sent by the PCRF unit.

In a fourth aspect, a policy and charging rules function unit is provided in the application. The policy and charging rules function unit includes a receiving module, a policy making module and a sending module. The receiving module is configured to receive a service chain selection policy sent by a cooperation device, where the service chain selection policy includes a corresponding relation among first policy contextual information, a first application type and a first service chain, the first service chain is a path formed by a forwarding device and a value-added service device both of which a first service flow need to pass through, the first service flow is from a user matching the first policy contextual information, and a type of the first service flow is the first application type, and where the service chain selection policy further includes a corresponding relation among second policy contextual information, a second application type and a second service chain, the second service chain is a path formed by a forwarding device and a value-added service device both of which a second service flow need to pass through, the second service flow is from a user having the second policy contextual information, and a type of the second service flow is the second application type, and the receiving module sends the service chain selection policy to the policy making module. The policy making module is configured to receive the service chain selection policy and the first policy contextual information, determine a service chain selection control policy based on the first policy contextual information and the service chain selection policy, where the service chain selection control policy includes a corresponding relation between the first application type and the first service chain, and the policy making module sends the service chain selection control policy to the sending module. The sending module is configured to receive the service chain selection control policy, and send the service chain selection control policy to a flow classifier.

Combined with the fourth aspect, in a first possible implementation of the fourth aspect of the application, the policy contextual information includes at least one of subscriber signing type information, subscriber terminal access type information, subscriber terminal location information and cell congestion information.

Combined with the fourth aspect, in a second possible implementation of the fourth aspect of the application, the sending module is specifically configured to send, through an extended Gx interface protocol, the service chain selection control policy to the flow classifier.

In a fifth aspect, a controller is provided in the application. The controller includes a receiving module, a generating module and a sending module. The receiving module is configured to receive a logic service chain definition sent by a cooperation device, where the logic service chain definition includes information of a value-added service device through which a service chain needs to pass, the service chain is a path through which a service flow needs to pass, the service chain comprises forwarding devices and value-added service devices both of which the service flow needs to pass through, and each service chain has an identifier, and the receiving module sends the logic service chain definition to the generating module. The generating module is configured to receive the logic service chain definition, generate a flow forwarding table for each forwarding device through which the service chain passes, based on the logic service chain definition, where the flow forwarding table includes matching information and operation information, the matching information includes the identifier of the service chain, the operation information is to instruct one of the forwarding devices to send a message having the identifier to a value-added service devices in the service chain directly connected to the forwarding device after the message is received, and to forward the message returned by the value-added service device to a next forwarding device in the service chain after the message is returned by the value-added service device, and the generating module sends the flow forwarding table to the sending module. The sending module is configured to receive the flow forwarding table, and send the flow forwarding table generated for each forwarding device to each forwarding device through which the service chain passes.

In the solution, a policy is made based on the policy contextual information and the service chain selection policy, to obtain the service chain selection control policy. Thus the flow classifier executes the service chain selection control policy, detects the service flow with the application type, and adds the identifier of the service chain corresponding to the application type to the message of the service flow. Therefore, the message with the identifier of the service chain is transmitted along a predefined path which passes through only the required value-added service device, rather than a superfluous value-added service device, which is advantageous to reduce loads of the device. In addition, it is also advantageous to reduce possible failure points.

DETAILED DESCRIPTION OF THE EMBODIMENTS

In the description hereinafter, specific details such as a specific system structure, an interface, and a technique are proposed for illustration rather than for limitation, in order to obtain thorough understanding of the application. However, those skilled in the art should be clear that, the application may be implemented according to other embodiments without these specific details. In other cases, detailed description of well-known devices, circuits and methods are omitted, to prevent unnecessary details from impeding the description of the application.

Figure 2:
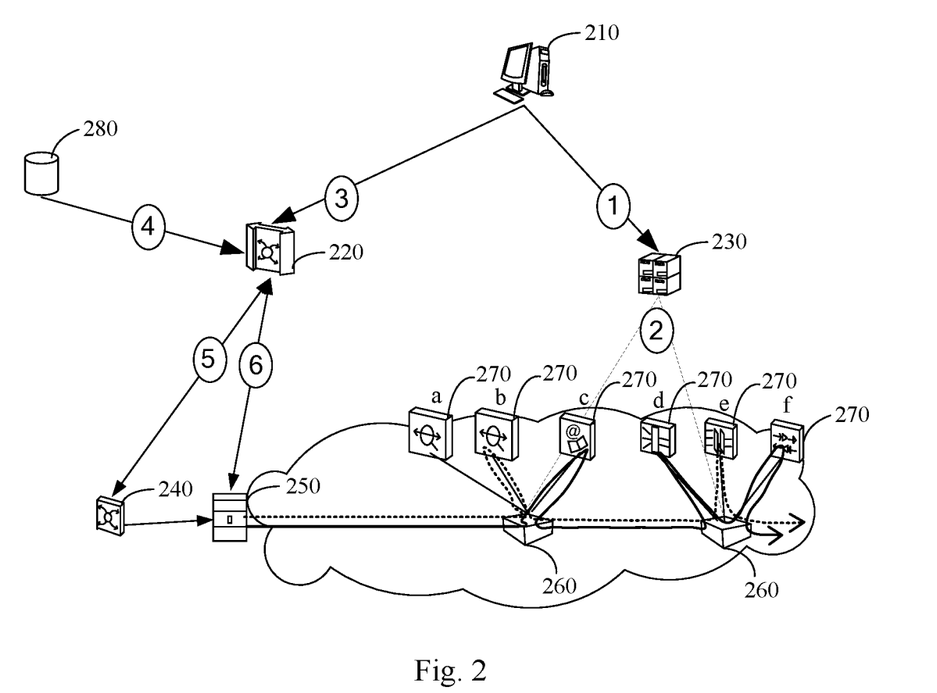
FIG. 2 is a structural diagram of a service chain selection control system according to an embodiment of the application.

Referring to FIG. 2, a structural diagram of a service chain selection control system according to an embodiment of the application is provided. The service chain selection control system according to the embodiment of the application includes a cooperation device 210, a policy and charging rules function (PCRF) unit 220, a controller 230, an access device 240, a flow classifier 250, a plurality of forwarding devices 260 and a plurality of value-added service devices 270. An end of the cooperation device 210 is connected to a first end of the PCRF unit 220, a second end of the PCRF unit 220 is connected to an end of the access device 240, a third end of the PCRF unit 220 is connected to a first end of the flow classifier 250, and the other end of the access device 240 is connected to a second end of the flow classifier 250. The other end of the cooperation device 210 is connected to the controller 230, and the controller 230 is further connected to forwarding devices 260 under jurisdiction of the controller 230. A third end of the flow classifier 250 is connected to at least one of the forwarding devices 260 under jurisdiction of the controller 230. The forwarding devices 260 are connected to the value-added service devices 270. Each of the value-added service devices 270 is connected to one of the forwarding devices 260, and the plurality of value-added service devices 270 may be connected to a same one of the forwarding devices 260. The value-added service devices 270 as shown in the figure include value-added service devices a, b, c, d, e and f.

The cooperation device 210 sends a logic service chain definition to the controller 230. The logic service chain definition is predefined based on actual use requirements, including information of the value-added service devices 270 through which service chains need to pass. The service chain is a path through which a service flow needs to pass and includes forwarding devices 260 through which the service flow needs to pass and value-added service devices 270 through which the service flow needs to pass. Each service chain has an identifier. For example, the logic service chain definition is: a service chain having an identifier 1 needs to pass through the value-added service devices b and e sequentially, a service chain having an identifier 2 needs to pass through the value-added service devices c, d, and f sequentially, and a service chain having an identifier 3 needs to pass through the value-added service devices a, c, and d sequentially.

After receiving the logic service chain definition, the controller 230 obtains the information of the value-added service devices 270 through which the service chains need to pass. Then, forwarding devices 260 connected to the value-added service devices 270 through which the service chains need to pass are found out based on a network topology, so as to determine the forwarding devices 260 to pass through. An optimal path for each service flow is planned based on the forwarding devices 260 to pass through and load states of the forwarding devices 260. After the optimal path for each service chain is planned, a flow forwarding table is generated for each of the forwarding devices 260 in the service chain. The flow forwarding table includes matching information and operation information. The matching information includes identifiers of service chains. The operation information is to instruct the forwarding device 260 to send a message having an identifier to the value-added service devices 270 in a service chain directly connected to the forwarding device 260, after the message is received, and to forward the message to a next forwarding device 260 in the service chain after the message is returned by the value-added service devices 270.

In another aspect, the cooperation device 210 sends a service chain selection policy to the PCRF unit 220. The service chain selection policy is predefined based on the actual use requirements, including relation information among policy contextual information, application types and service chains. Based on the actual use requirements, the policy contextual information includes at least one of the following: subscriber signing type information, subscriber terminal access type information, subscriber terminal location information and cell congestion information. For example, the subscriber signing type may be a gold medal user, a silver medal user, or an ordinary user. The subscriber terminal access type includes at least one of the following: access to a 2G network, access to a 3G network, and access to a WiFi (Wireless Fidelity) network. The application type includes at least one of the following: web browsing, video browsing, service flow for accessing a specific website address, service flow of a specific source internet protocol (IP) address, and service flow of a specific application protocol.

For example, in an embodiment, the service chain selection policy may select a service chain having the identifier 1 for a service flow with an application type of web browsing when a silver medal user accesses a 2G network, select a service chain having the identifier 2 for a service flow with an application type of video when the silver medal user accesses the 2G network, and select a service chain having the identifier 3 for a service flow with an application type of video when a gold medal user accesses a 3G network.

The PCRF unit 220 receives the policy contextual information and the service chain selection policy sent by the cooperation device 210, and obtains a service chain selection control policy based on the policy contextual information and the service chain selection policy. For example, an access type of an access user which the PCRF unit 220 obtains from the access device 240 is access to a 2G network, and the subscriber signing type information obtained from a subscriber signing type database 280 is a silver medal user, then the service chain selection control policy obtained by the PCRF unit 220 based on the service chain selection policy is to select a service chain having the identifier 1 for the service flow with the application type of web browsing, and to select the service chain having the identifier 2 for the service flow with the application type of video. After obtaining the service chain selection control policy, the PCRF unit 220 sends the service chain selection control policy to the flow classifier 250. The conventional Gx interface protocol can not supported to send the service chain selection control policy to the flow classifier 250, therefore the Gx interface protocol needs to be extended. According to an embodiment of the application, a string-typed field may be introduced into the Gx interface protocol, in order to bear the identifier of the service chain.

After receiving the service chain selection control policy sent by the PCRF unit 220, the flow classifier 250 detects the service flows with the application types, and adds identifiers of the service chains to the messages of the service flows corresponding to the application types. For example, after receiving the service chain selection control policy which is to select the service chain having the identifier 1 for the service flow with the application type of web browsing, the flow classifier 250 detects the service flow of web browsing, and adds the identifier 1 to the message of the service flow. After receiving the service chain selection control policy which is to select the service chain having the identifier 2 for the service flow with the application type of video browsing, the flow classifier 250 detects the service flow of video browsing, and adds the identifier 2 to the message of the service flow. Then, the messages of the service flows with the added identifiers are sent to the forwarding device 260 directly connected to the flow classifier 250.

Since the forwarding device 260 has already received the flow forwarding table in advance, the forwarding devices 260, after receiving the messages with the added identifiers, matches the messages based on identifiers of service chains in matching information, and operates based on operation information. The forwarding devices 260 sends the message with the identifier in the matching information to the value-added service devices 270 in the service chain directly connected to the forwarding device 260, and forwards the message to a next forwarding device 260 in the service chain after the message is returned by the value-added service devices 270.

The logic service chain definition includes information of the value-added service devices 270 to pass through, the flow forwarding table is generated by the controller 220 based on the optimal path planned according to the logic service chain definition, and the forwarding devices 260 only send the messages with the identifiers in the matching information to corresponding value-added service devices 270. Therefore, as long as the forwarding devices 260 operate based on the flow forwarding table, the messages only pass through the value-added service devices 270 to pass through, rather than passing through value-added service devices 270 through which it does not need to pass. As shown in the figure, the service flow with the identifier 1 only passes through the value-added service devices b and e, rather than the value-added service devices a, c, d, and f (as shown in the figure by dotted lines), and the service flow with the identifier 2 only passes through the value-added service devices c, d and f, rather than the value-added service devices a, b, and e. Therefore, the solution of the disclosure is advantageous to reduce the load of the device. In addition, the value-added service devices through which it does not need to pass are not passed through, therefore it is advantageous to reduce possible failure points.

Figure 3:
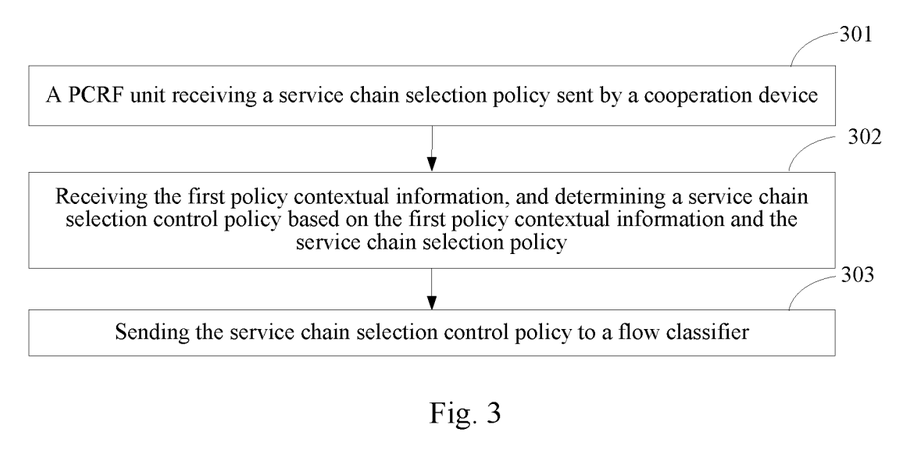
FIG. 3 is a flow chart of a service chain selection control method according to an embodiment of the application.

Referring to FIG. 3, a flow chart of a service chain selection control method according to an embodiment of the application is shown. The embodiment is described from the perspective of a policy and charging rules function PCRF unit. The service chain selection control method according to the embodiment of the application includes the following operations.

In 301, a PCRF unit receives a service chain selection policy sent by a cooperation device.

The cooperation device sends the service chain selection policy to the PCRF unit, and the PCRF unit accordingly receives the service chain selection policy sent by the cooperation device. The service chain selection policy includes a corresponding relation among first policy contextual information, a first application type and a first service chain. The first service chain is a path formed by the forwarding devices and the value-added service devices both of which a first service flow needs to pass through. The first service flow is from a user matching the first policy contextual information, and a type of the first service flow is the first application type. The service chain selection policy further includes a corresponding relation among second policy contextual information, a second application type and a second service chain. The second service chain is a path formed by the forwarding devices and the value-added service devices both of which a second service flow needs to pass through. The second service flow is from a user with the second policy contextual information, and a type of the second service flow is the second application type.

The policy contextual information includes at least one of the following: subscriber signing type information, subscriber terminal access type information, subscriber terminal location information and cell congestion information. For example, the subscriber signing type may be a gold medal user, a silver medal user, or an ordinary user. The subscriber terminal access type includes at least one of the following: access to a 2G network, access to a 3G network, and access to a WiFi (Wireless Fidelity) network. The application type includes at least one of the following: web browsing, video browsing, service flow for accessing a specific website address, service flow of a specific source internet protocol (IP) address, and service flow of a specific application protocol.

For example, in an embodiment, the service chain selection policy may select a service chain having the identifier 1 for a service flow with an application type of web browsing when a silver medal user accesses a 2G network, select a service chain having the identifier 2 for a service flow with an application type of video when the silver medal user accesses the 2G network, and select a service chain having the identifier 3 for a service flow with an application type of video when a gold medal user accesses a 3G network.

In 302, the first policy contextual information is received, and it is determined a service chain selection control policy based on the first policy contextual information and the service chain selection policy. The service chain selection control policy includes a corresponding relation between the first application type and the first service chain.

For example, the access type of an access user which the PCRF unit obtains from the access device is access to a 2G network, and the subscriber signing type information obtained from a subscriber signing type database is a silver medal user, then the service chain selection control policy obtained by the PCRF unit based on the service chain selection policy is to select a service chain having the identifier 1 for the service flow with the application type of web browsing, and to select a service chain having the identifier 2 for the service flow with the application type of video.

In 303, the service chain selection control policy is sent to a flow classifier.

After obtaining the service chain selection control policy, the PCRF unit sends the service chain selection control policy to the flow classifier. The conventional Gx interface protocol can not supported to send the service chain selection control policy to the flow classifier, therefore the Gx interface protocol needs to be extended. According to an embodiment of the application, a string-typed field may be introduced into the Gx interface protocol, in order to bear the identifier of the service chain.

Figure 4:
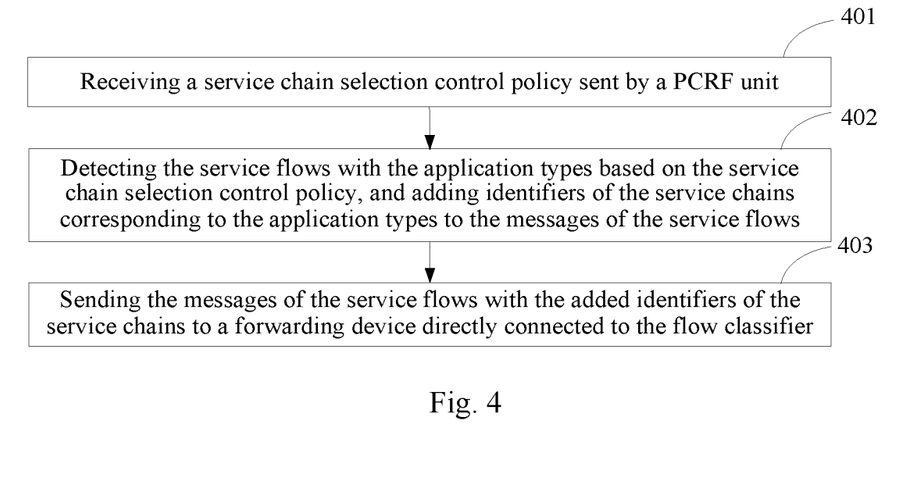
FIG. 4 is a flow chart of a service chain selection control method according to another embodiment of the application.

Referring to FIG. 4, a flow chart of a service chain selection control method according to another embodiment of the application is shown. The service chain selection control method according to the embodiment is described from the perspective of a flow classifier. The service chain selection control method according to the embodiment of the application includes the following operations.

In 401, a flow classifier receives a service chain selection control policy sent by a PCRF unit.

After executing the method shown in FIG. 3, the PCRF unit obtains the service chain selection control policy, and sends the service chain selection control policy to the flow classifier. And then the flow classifier receives the service chain selection control policy sent by the PCRF unit. The service chain selection control policy includes a corresponding relation between application types and identifiers of service chains. The service chain is a path formed by the forwarding devices and the value-added service devices both of which a service flow with an application type need to pass through. For example, the service chain selection control policy is to select a service chain having the identifier 1 for the service flow with the application type of web browsing, and to select a service chain having the identifier 2 for the service flow with the application type of video.

In 402, the flow classifier detects the service flows with the application types based on the service chain selection control policy, and adding identifiers of the service chains to the messages of the service flows.

The flow classifier detects the service flow of web browsing, and adds the identifier 1 to the message of the service flow. The flow classifier detects the service flow of video browsing, and adds the identifier 2 to the message of the service flow.

In 403, the flow classifier sends the messages of the service flows with the added identifiers to a forwarding device directly connected to the flow classifier.

Figure 5:
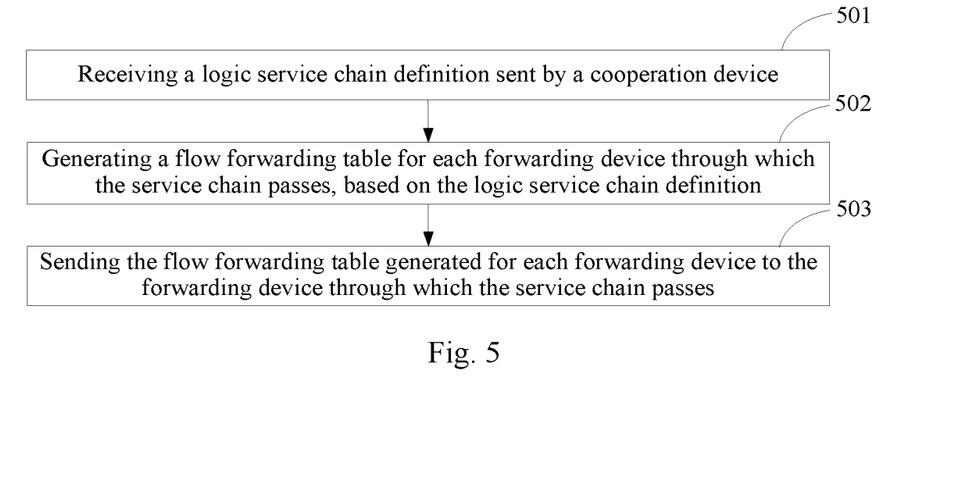
FIG. 5 is a flow chart of a service chain selection control method according to still another embodiment of the application.

Referring to FIG. 5, a flow chart of a service chain selection control method according to still another embodiment of the application is shown. The service chain selection control method according to the embodiment is described from the perspective of a controller. The service chain selection control method according to the embodiment of the application includes the following operations.

In 501, a controller receives a logic service chain definition sent by a cooperation device.

The cooperation device sends the logic service chain definition to the controller. Accordingly, the controller receives the logic service chain definition sent by the cooperation device. The logic service chain definition is predefined based on actual use requirements, including information of value-added service devices through which service chains need to pass. The service chain is a path through which a service flow needs to pass and includes forwarding devices through which the service flow needs to pass and value-added service devices through which the service flow needs to pass. Each service chain has an identifier. For example, the logic service chain definition is: a service chain having an identifier 1 needs to pass through the value-added service devices b and e sequentially, a service chain having an identifier 2 needs to pass through the value-added service devices c, d, and f sequentially, and a service chain having an identifier 3 needs to pass through the value-added service devices a, c, and d sequentially.

In 502, the controller generates a flow forwarding table for each of the forwarding devices through which the service chains pass, based on the logic service chain definition.

After receiving the logic service chain definition, the controller obtains the information of the value-added service devices through which the service chains need to pass. Then, forwarding devices connected to the value-added service devices through which the service chains need to pass are found out based on a network topology, so as to determine the forwarding devices to pass through. An optimal path for each service chain is planned based on the forwarding devices to pass through and load states of the forwarding devices to determine the service chain. After the optimal path for each service chain is planned, a flow forwarding table is generated for each of the forwarding devices in the service chain. The flow forwarding table includes matching information and operation information. The matching information includes identifiers of service chains. The operation information is to instruct the forwarding device to send a message having an identifier to the value-added service devices in a service chain directly connected to the forwarding device after the message is received, and to forward the message to a next forwarding device in the service chain after the message is returned by the value-added service devices.

In 503, flow forwarding tables generated for the forwarding devices are sent to the forwarding devices through which the service chains pass.

Figure 6:
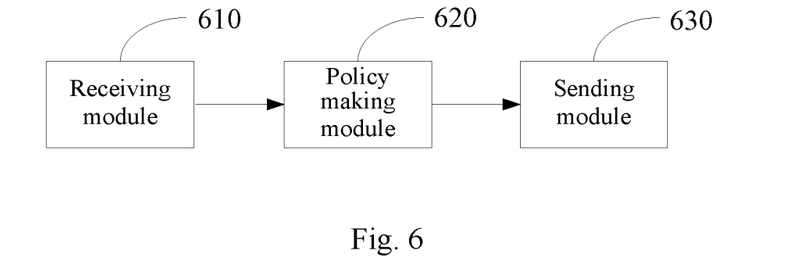
FIG. 6 is a structural diagram of a policy and charging rules function unit according to an embodiment of the application.

Referring to FIG. 6, a structural diagram of a policy and charging rules function unit according to an embodiment of the application is shown. The policy and charging rules function unit according to the embodiment includes a receiving module 610, a policy making module 620 and a sending module 630.

The receiving module 610 is configured to receive a service chain selection policy sent by a cooperation device.

The service chain selection policy includes a corresponding relation among first policy contextual information, a first application type and a first service chain. The first service chain is a path formed by the forwarding devices and the value-added service devices both of which a first service flow needs to pass through. The first service flow is from a user matching the first policy contextual information, and a type of the first service flow is the first application type. The service chain selection policy further includes a corresponding relation among second policy contextual information, a second application type and a second service chain. The second service chain is a path formed by the forwarding device and the value-added service device both of which a second service flow needs to pass through. The second service flow is from a user with the second policy contextual information, and a type of the second service flow is the second application type. The policy contextual information includes at least one of the following: subscriber signing type information, subscriber terminal access type information, subscriber terminal location information and cell congestion information. For example, the subscriber signing type may be a gold medal user, a silver medal user, or an ordinary user. The subscriber terminal access type includes at least one of the following: access to a 2G network, access to a 3G network, and access to a WiFi (Wireless Fidelity) network. The application type includes at least one of the following: web browsing, video browsing, service flow for accessing a specific website address, service flow of a specific source internet protocol (IP) address, and service flow of a specific application protocol. For example, in an embodiment, the service chain selection policy may select the service chain having the identifier 1 for a service flow with an application type of web browsing when a silver medal user accesses a 2G network, select the service chain having the identifier 2 for a service flow with an application type of video when the silver medal user accesses the 2G network, and select a service chain having the identifier 3 for a service flow with an application type of video when a gold medal user accesses a 3G network.

The receiving module 610 sends the service chain selection policy to the policy making module 620.

The policy making module 620 is configured to receive the first policy contextual information, and determines a service chain selection control policy based on the received first policy contextual information and the service chain selection policy. The service chain selection control policy includes a corresponding relation between the first application type and the first service chain.

For example, the access type of an access user which a PCRF unit obtains from the access device is access to a 2G network, and the subscriber signing type information obtained from a subscriber signing type database is a silver medal user, then the service chain selection control policy obtained by the PCRF unit based on the service chain selection policy is to select a service chain having the identifier 1 for the service flow with the application type of web browsing, and to select a service chain having the identifier 2 for the service flow with the application type of video.

The policy making module 620 sends the service chain selection control policy to the sending module 630.

The sending module 630 is configured to receive the service chain selection control policy, and send the service chain selection control policy to a flow classifier.

Figure 7:
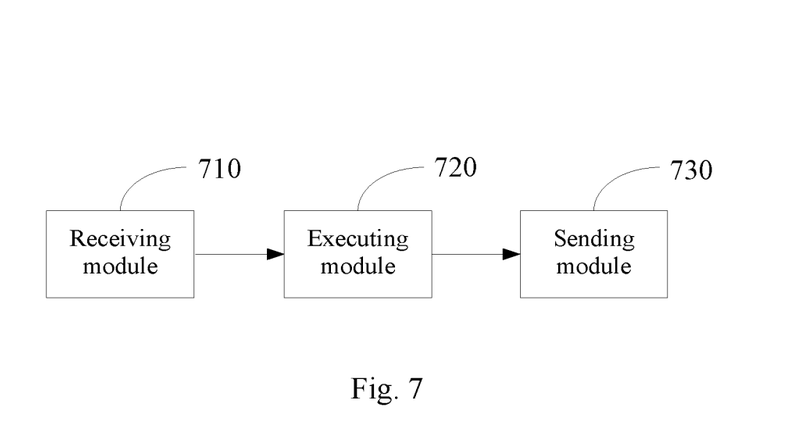
FIG. 7 is a structural diagram of a flow classifier according to an embodiment of the application.

Referring to FIG. 7, a structural diagram of a flow classifier according to an embodiment of the application is shown. The flow classifier according to the embodiment includes a receiving module 710, an executing module 720 and a sending module 730.

The receiving module 710 is configured to receive a service chain selection control policy sent by a PCRF unit.

For example, the receiving module 710 is configured to receive service flows, and the service chain selection control policy sent by the PCRF unit. The service chain selection control policy includes a corresponding relation between application types and identifiers of service chains. The service chain is a path formed by the forwarding devices and the value-added service devices both of which a service flow with an application type need to pass through. For example, the service chain selection control policy is to select a service chain having the identifier 1 for the service flow with the application type of web browsing, and to select a service chain having the identifier 2 for the service flow with the application type of video.

The receiving module 710 sends the service chain selection control policy to the executing module 720.

The executing module 720 is configured to receive the service chain selection control policy, detect the service flows with the application types based on the service chain selection control policy, and add identifiers of the service chains to the messages of the service flows.

For example, the executing module 720 detects the service flow of web browsing, and adds the identifier 1 to the message of the service flow. The executing module 720 detects the service flow of video browsing, and adds the identifier 2 to the message of the service flow.

The executing module 720 sends the messages with the added identifiers to the sending module 730.

The sending module 730 is configured to receive the messages with the added identifiers, and send the messages of the service flows with the added identifiers to a forwarding device directly connected to the flow classifier.

Optionally, the receiving module 710 is configured to receive, through an extended Gx interface protocol, the service chain selection control policy sent by the PCRF unit.

Figure 8:
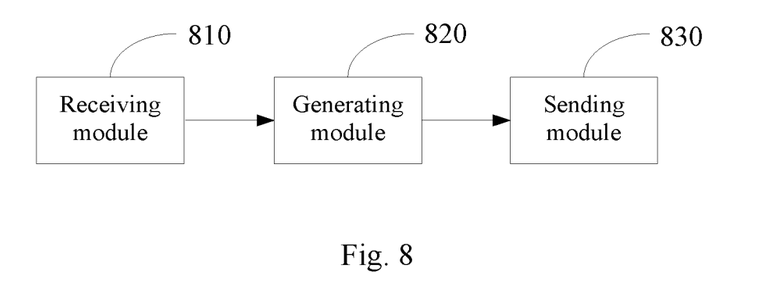
FIG. 8 is a structural diagram of a controller according to an embodiment of the application.

Referring to FIG. 8, a structural diagram of a controller according to an embodiment of the application is shown. The controller according to the embodiment includes a receiving module 810, a generating module 820 and a sending module 830.

The receiving module 810 is configured to receive a logic service chain definition sent by a cooperation device.

For example, the receiving module 810 receives the logic service chain definition sent by the cooperation device. The logic service chain definition is predefined based on actual use requirements, including information of value-added service devices through which service chains need to pass. The service chain is a path through which a service flow needs to pass and includes forwarding devices through which the service flow needs to pass and value-added service devices through which the service flow needs to pass. Each service chain has an identifier. For example, the logic service chain definition is: a service chain having an identifier 1 needs to pass through the value-added service devices b and e sequentially, a service chain having an identifier 2 needs to pass through the value-added service devices c, d, and f sequentially, and a service chain having an identifier 3 needs to pass through the value-added service devices a, c, and d sequentially.

The receiving module 810 sends the logic service chain definition to the generating module 820.

The generating module 820 is configured to receive the logic service chain definition, and generate, based on the logic service chain definition, a flow forwarding table for each of forwarding devices through which the service chains pass.

For example, after receiving the logic service chain definition, the information of the value-added service devices through which the service chains need to pass is obtained. Then, forwarding devices connected to the value-added service devices through which the service chains need to pass are found out based on a network topology, so as to determine the forwarding devices to pass through. An optimal path for each service chain is planned based on the forwarding devices to pass through and load states of the forwarding devices, to determine the service chain. After the optimal path for each service chain is planned, the generating module 820 generates a flow forwarding table for each of the forwarding devices in the service chain. The flow forwarding table includes matching information and operation information. The matching information includes identifiers of service chains. The operation information is to instruct the forwarding device to send a message having an identifier to the value-added service devices in a service chain directly connected to the forwarding device after the message is received, and to forward the message to a next forwarding device in the service chain after the message is returned by the value-added service devices.

The generating module 820 sends the flow forwarding tables to the sending module 830.

The sending module 830 is configured to receive flow forwarding tables, and send the flow forwarding tables generated for the forwarding devices to the forwarding devices through which the service chains pass.

Figure 9:
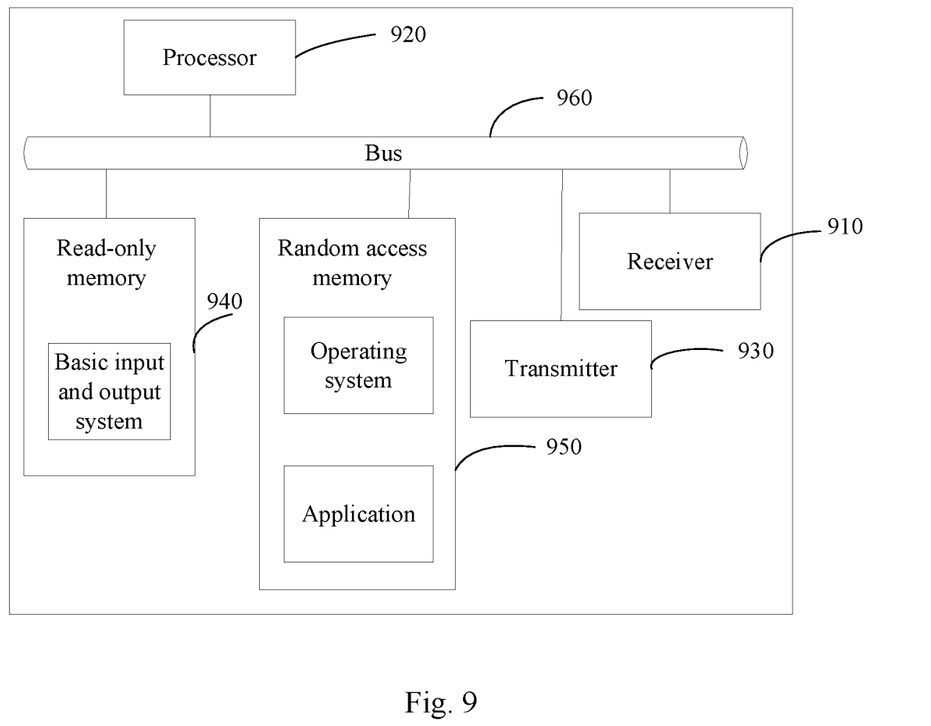
FIG. 9 is a structural diagram of a policy and charging rules function unit according to another embodiment of the application.

Referring to FIG. 9, a structural diagram of a policy and charging rules function unit according to another embodiment of the application is shown. The policy and charging rules function unit according to the embodiment includes a receiver 910, a processor 920, a transmitter 930, a read-only memory 940, a random access memory 950, and a bus 960.

The receiver 910 is configured to receive data.

The processor 920 controls the operation of the policy and charging rules function unit. The processor 920 may be further referred to as CPU (central processing unit). The processor 920 may be an integrated circuit chip with a signal processing capability. The processor 920 may be further a general-purpose processor, a digital signal processor (DSP), an application specific integrated circuit (ASIC), a field programmable gate array (FPGA) or other programmable logic devices, a discrete gate or transistor logic device, and a discrete hardware component. The general-purpose processor may be a microprocessor, or the processor may be any conventional processor.

The transmitter 930 is configured to send data.

A memory may include the read-only memory 940 and the random access memory 950, and may provide instructions and data to the processor 920. A part of the memory may further include a non-volatile random access memory (NVRAM).

Components of the policy and charging rules function unit are coupled together through the bus 960. The bus 960 includes a data bus, and may further include a power bus, a control bus, a status signal bus, or the like. For clear description, various buses are referred to as the bus 960, collectively.

The memory stores the following elements: operating instructions and an operating system. The memory may execute a module or a data structure, a subset thereof, or an extension set thereof.

The operating instructions may implement operations corresponding to the instructions.

The operating system includes a system program, to implement a fundamental service and to process a hardware-based task.

In the embodiment of the application, the processor 920 executes the following operations through calling the operating instructions (the operating instructions may be stored in the operating system) stored in the memory.

The processor 920 calls the receiver 910 to receive a service chain selection policy sent by a cooperation device. The service chain selection policy includes a corresponding relation among first policy contextual information, a first application type and a first service chain. The first service chain is a path formed by the forwarding devices and the value-added service devices both of which a first service flow needs to pass through. The first service flow is from a user matching the first policy contextual information, and a type of the first service flow is the first application type. The service chain selection policy further includes a corresponding relation among second policy contextual information, a second application type and a second service chain. The second service chain is a path formed by the forwarding devices and the value-added service devices both of which a second service flow needs to pass through. The second service flow is from a user with the second policy contextual information, and a type of the second service flow is the second application type.

The processor 920 calls the receiver 910 to receive the first policy contextual information, and the processor 920 determines a service chain selection control policy based on the first policy contextual information and the service chain selection policy. The service chain selection control policy includes a corresponding relation between the first application type and the first service chain.

The processor 920 calls the transmitter 930 to send the service chain selection control policy to a flow classifier.

Optionally, the policy contextual information includes at least one of the following: subscriber signing type information, subscriber terminal access type information, subscriber terminal location information and cell congestion information.

Optionally, the transmitter 930 sends the service chain selection control policy to the flow classifier through an extended Gx interface protocol.

Figure 10:
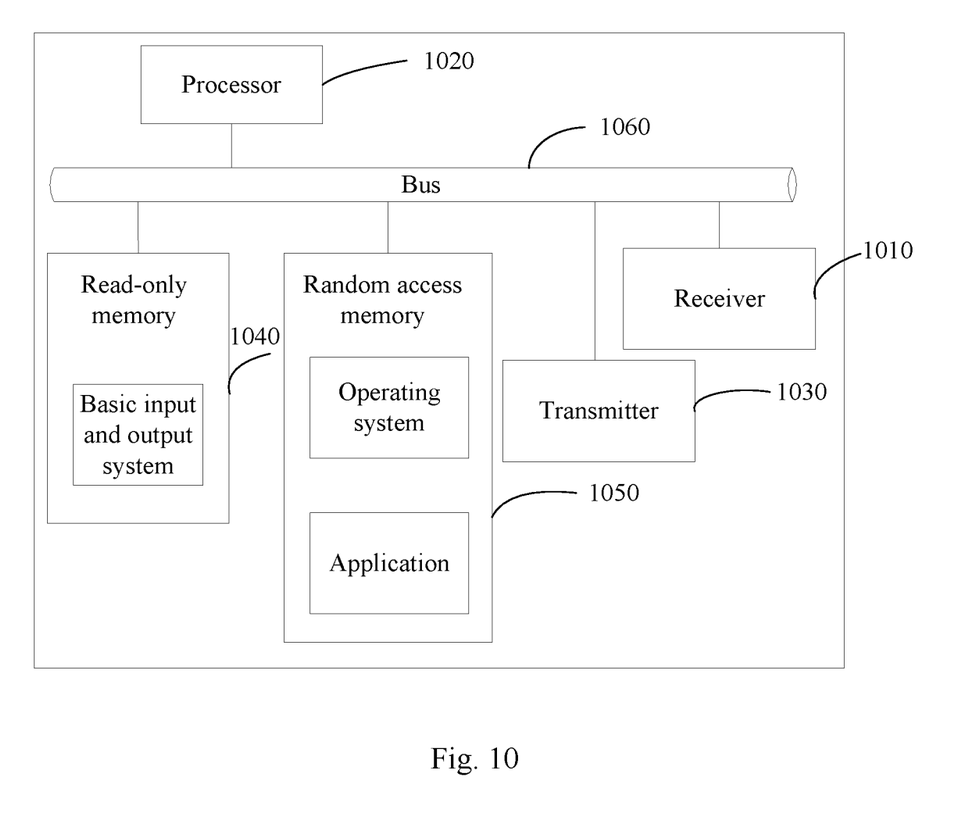
FIG. 10 is a structural diagram of a flow classifier according to another embodiment of the application.

Referring to FIG. 10, a structural diagram of a flow classifier according to another embodiment of the application is shown. The flow classifier according to the embodiment includes a receiver 1010, a processor 1020, a transmitter 1030, a read-only memory 1040, a random access memory 1050, and a bus 1060.

The receiver 1010 is configured to receive data.

The processor 1020 controls the operation of the flow classifier. The processor 1020 may be further referred to as CPU (central processing unit). The processor 1020 may be an integrated circuit chip with a signal processing capability. The processor 1020 may be further a general-purpose processor, a digital signal processor (DSP), an application specific integrated circuit (ASIC), a field programmable gate array (FPGA) or other programmable logic devices, a discrete gate or transistor logic device, and a discrete hardware component. The general-purpose processor may be a microprocessor, or the processor may be any conventional processor.

The transmitter 1030 is configured to send data.

A memory may include the read-only memory 1040 and the random access memory 1050, and may provide instructions and data to the processor 1020. A part of the memory may further include a non-volatile random access memory (NVRAM).

Components of the flow classifier are coupled together through the bus 1060. The bus 1060 includes a data bus, and may further include a power bus, a control bus, a status signal bus, or the like. For clear description, various buses are referred to as the bus 1060, collectively.

The memory stores the following elements: operating instructions and an operating system. The memory may execute a module or a data structure, a subset thereof, or an extension set thereof.

The operating instructions may implement operations corresponding to the instructions.

The operating system includes a system program, to implement a fundamental service and to process a hardware-based task.

In the embodiment of the application, the processor 1020 executes the following operations through calling the operating instructions (the operating instructions may be stored in the operating system) stored in the memory.

The processor 1020 calls the receiver 1010 to receive service flows and a service chain selection control policy sent by a PCRF unit. The service chain selection control policy includes a corresponding relation between application types and identifiers of service chains. The service chain is a path formed by the forwarding devices and the value-added service devices both of which a service flow with an application type need to pass through.

The processor 1020 detects the service flows with the application types based on the service chain selection control policy, and adds identifiers of the service chains corresponding to the application types to the messages of the service flows.

The processor 1020 calls the transmitter 1030 to send the messages of the service flows with the added identifiers of the service chains to forwarding devices directly connected to the flow classifier.

Optionally, the processor 1020 calls the receiver 1010 to receive, through an extended Gx interface protocol, the service chain selection control policy sent by the PCRF unit.

Figure 11:
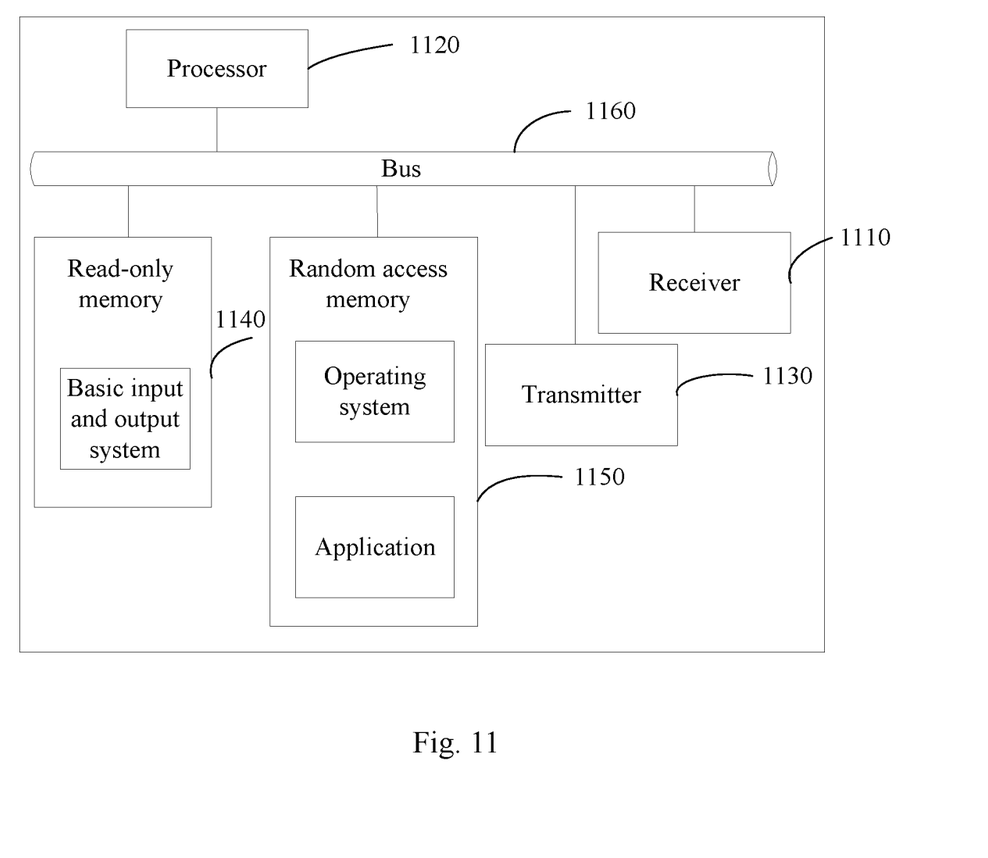
FIG. 11 is a structural diagram of a controller according to another embodiment of the application.

Referring to FIG. 11, a structural diagram of a controller according to another embodiment of the application is shown. The controller according to the embodiment includes a receiver 1110, a processor 1120, a transmitter 1130, a read-only memory 1140, a random access memory 1150, and a bus 1160.

The receiver 1110 is configured to receive data.

The processor 1120 controls the operation of the controller. The processor 1120 may be further referred to as CPU (central processing unit). The processor 1120 may be an integrated circuit chip with a signal processing capability. The processor 1120 may be further a general-purpose processor, a digital signal processor (DSP), an application specific integrated circuit (ASIC), a field programmable gate array (FPGA) or other programmable logic devices, a discrete gate or transistor logic device, and a discrete hardware component. The general-purpose processor may be a microprocessor, or the processor may be any conventional processor.

The transmitter 1130 is configured to send data.

A memory may include the read-only memory 1140 and the random access memory 1150, and may provide instructions and data to the processor 1120. A part of the memory may further include a non-volatile random access memory (NVRAM).

Components of the controller are coupled together through the bus 1160. The bus 1160 includes a data bus, and may further include a power bus, a control bus, a status signal bus, or the like. For clear description, various buses are referred to as the bus 1160, collectively.

The memory stores the following elements: operating instructions and an operating system. The memory may execute a module or a data structure, a subset thereof, or an extension set thereof.

The operating instructions may implement operations corresponding to the instructions.

The operating system includes a system program, to implement a fundamental service and to process a hardware-based task.

In the embodiment of the application, the processor 1120 executes the following operations through calling the operating instruction (the operating instructions may be stored in the operating system) stored in the memory.

The processor 1120 calls the receiver 1110 to receive a logic service chain definition sent by a cooperation device. The logic service chain definition includes information of value-added service devices through which service chains pass. The service chain is a path through which a service flow needs to pass and includes forwarding devices through which the service flow needs to pass and value-added service devices through which the service flow needs to pass. Each service chain has an identifier.

The processor 1120 generates a flow forwarding table for each of the forwarding devices through which the service chains pass. The flow forwarding table includes matching information and operation information. The matching information includes identifiers of service chains. The operation information is to instruct the forwarding device to send a message having an identifier to the value-added service devices in a service chain directly connected to the forwarding device after the message is received, and to forward the message returned by the value-added service devices to a next forwarding device in the service chain after the message is returned by the value-added service devices.

The transmitter 1130 sends flow forwarding tables generated for the forwarding devices to the forwarding devices through which the service chains pass.

It should be understood that, according to the embodiments of the disclosure, the disclosed system, apparatus and methods may be implemented in other ways. For example, the described apparatus embodiment is merely exemplary. The division of the units is merely based on logical functions, and the units may be divided with other approaches in practice. For example, multiple units or modules may be combined, or may be integrated into another system, or some features may be omitted or not be implemented. In addition, the displayed or discussed couplings, direct couplings or communication connections between individual components may be implemented via indirect couplings or communication connections between some interfaces, devices or units, which may be electrical, mechanical or in other forms.

The units described as separate components may be or may not be separated physically. The components shown as units may be or may not be physical units, i.e., the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit. The foregoing integrated units may be realized in a form of hardware, or realized in a form of software functional units.

If the integrated unit is implemented in the form of software function unit and the software function unit is sold or used as separate products, the software function unit may also be stored in a computer readable storage medium. Based on such understanding, the technical solutions of the disclosure, part of the disclosure that contributes to conventional technologies or part of the technical solutions may be embodied in the form of a software product. The computer software product is stored in a storage medium and includes several instructions for instructing a computer device (which may be personal computer, server, network device or the like) or a processor (processor) to implement all of or part of the steps of the methods according to the embodiments of the disclosure. The foregoing storage medium includes various media that can store programs, for example, USB disk, mobile hard disk drive, read-only memory (ROM), random access memory (RAM), magnetic disk, optical disk and the like.

What is claimed is:

1. A flow classifier, comprising:
one or more processors; and
a memory storing program instructions that, when executed by the one or more processors, configure the flow classifier to:
receive a first service flow, wherein a type of the first service flow is a first application type;
obtain, from a policy and charging rules function (PCRF) unit, a service chain selection control policy;
determine a first service chain corresponding to the first application type according to a first corresponding relation, wherein the service chain selection control policy comprises the first corresponding relation between the first application type and a first identifier of the first service chain; and
forward a second service flow to a forwarding device, wherein the second service flow comprises the first service flow and the first identifier of the first service chain, the first service chain comprises a path, the path comprises the forwarding device, and the first service flow flows through the forwarding device.

2. The flow classifier according to claim 1, wherein the service chain selection control policy is obtained through an extended Gx interface protocol from the PCRF unit.

3. The flow classifier according to claim 1, wherein the flow classifier is communicatively coupled with at least one of:
the PCRF unit, an access device, or one or more forwarding devices.

4. The flow classifier according to claim 1, wherein the path further comprises a value-added service device.

5. A policy and charging rules function (PCRF) unit, comprising:
one or more processors; and
a memory storing program instructions that, when executed by the one or more processors, configure the PCRF unit to:
obtain a service chain selection policy, wherein the service chain selection policy comprises a first corresponding relation corresponding to first policy contextual information, a first application type, and a first service chain;
determine a first service chain selection control policy based on the first policy contextual information and the service chain selection policy, wherein the first service chain selection control policy comprises the first corresponding relation between the first application type and the first service chain; and
send the first service chain selection control policy to a flow classifier,
wherein the first service chain is a path comprising one or more first forwarding devices, a first service flow needs to pass through the one or more first forwarding devices, the first service flow is from a user device matching the first policy contextual information, and a type of the first service flow is the first application type.

6. The PCRF unit according to claim 5, wherein the first policy contextual information comprises at least one of: subscriber signing type information, subscriber terminal access type information, subscriber terminal location information, or cell congestion information.

7. The PCRF unit according to claim 5, wherein the PCRF unit is configured to send, through an extended Gx interface protocol, the first service chain selection control policy to the flow classifier.

8. The PCRF unit according to claim 5, wherein the first policy contextual information is from at least one of: a cooperation device, an access device, or a subscriber signing type database.

9. A non-transitory computer readable storage medium, comprising instructions that, when executed by a computer, cause the computer to:
receive a first service flow, wherein a type of the first service flow is a first application type;
obtain, from a policy and charging rules function (PCRF) unit, a service chain selection control policy;
determine a first service chain corresponding to the first application type according to a first corresponding relation, wherein the service chain selection control policy comprises the first corresponding relation between the first application type and a first identifier of the first service chain; and
forward a second service flow to a forwarding device, wherein the second service flow comprises the first service flow and the first identifier of the first service chain, the first service chain comprises a path, the path comprises the forwarding device, and the first service flow flows through the forwarding device.

10. The non-transitory computer readable storage medium according to claim 9, wherein the service chain selection control policy is obtained through an extended Gx interface protocol from the PCRF unit.

* * * * *

UNITED STATES PATENT AND TRADEMARK OFFICE
CERTIFICATE OF CORRECTION

PATENT NO. : 11,240,159 B2  
APPLICATION NO. : 16/529325  
DATED : February 1, 2022  
INVENTOR(S) : Huang et al.

Page 1 of 1

It is certified that error appears in the above-identified patent and that said Letters Patent is hereby corrected as shown below:

On the Title Page

Item [56], page 2, delete "2012/0140449 A1 12/2012 Chen et al." and insert -- 2012/0140449 A1 6/2012 Chen et al. --.

Signed and Sealed this  
Tenth Day of May, 2022

Katherine Kelly Vidal  
*Director of the United States Patent and Trademark Office*